R. V. MERRITT.
CULTIVATOR.
APPLICATION FILED APR. 20, 1912.
1,051,612.
Patented Jan. 28, 1913.
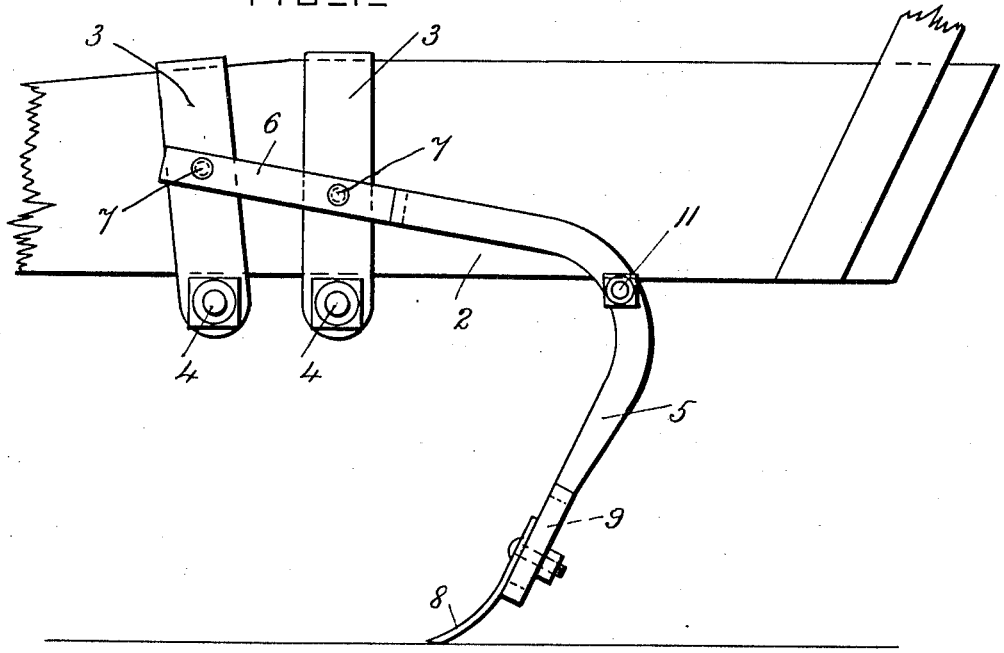
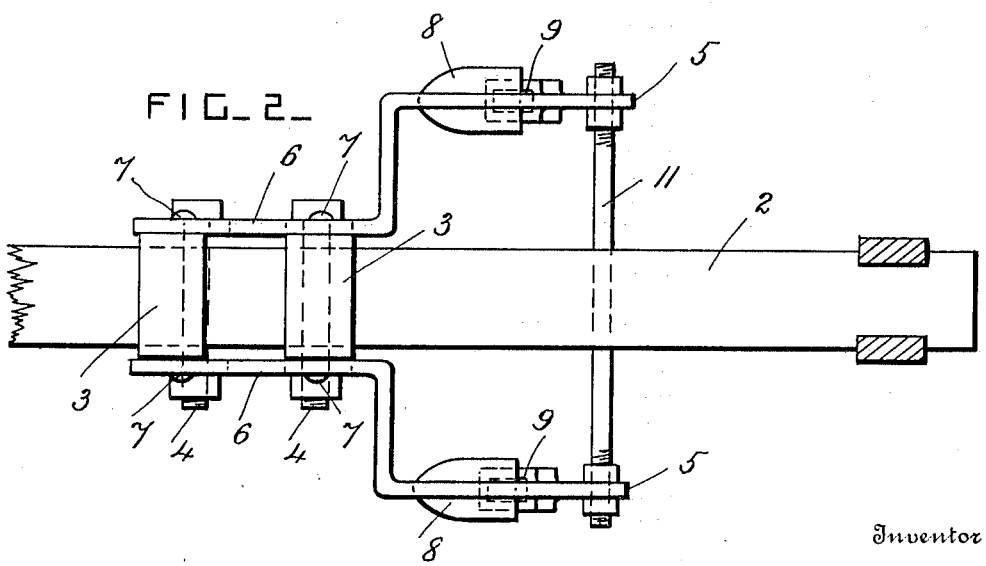

UNITED STATES PATENT OFFICE.

ROBERT V. MERRITT, OF CENTER HILL, FLORIDA.

CULTIVATOR.

1,051,612.      Specification of Letters Patent.      Patented Jan. 28, 1913.

Application filed April 20, 1912. Serial No. 692,183.

*To all whom it may concern:*

Be it known that I, ROBERT V. MERRITT, a citizen of the United States, residing at Center Hill, in the county of Sumter and State of Florida, have invented certain new and useful Improvements in Cultivators; and I do hereby declare the following to be a full, clear, and exact description of the invention, such as will enable others skilled in the art to which it appertains to make and use the same.

This invention relates to cultivators; and it consists of an attachment adapted to be connected to a plow beam in place of the plow, and constructed as hereinafter fully described and claimed.

In the drawings, Figure 1 is a side view of a portion of a plow beam provided with an attachment according to this invention. Fig. 2 is a plan view of the same.

The plow beam 2 is of any approved form suitable for an ordinary draft plow, and in carrying out this invention the plow and its standard are removed entirely when the cultivator attachment is to be used.

Two U-shaped clamps 3 are provided and having clamping bolts 4 at their ends. These two clamps are slipped over the plow beam, and 5 are two cultivator standards or arms which are secured to the clamps 3.

The main portions of the cultivator standards are curved, and they have off-set brackets or extensions 6 at their upper ends. These brackets are secured pivotally to the middle parts of the sides of the two clamps 3 by rivets 7, so that the two clamps are held at a prearranged distance apart. The clamps may be placed parallel to each other or they may be moved pivotally on the rivets or pivot pins 7 to a limited extent, so that they may be set at different angles to each other and to the offset extensions 6. This enables the clamps to be applied to different parts of a plow beam of irregular shape, or to plow beams of different shapes, and when the clamps have been adjusted on the plow beam, and the bolts 4 have tightened up, the standards are rigidly secured to the plow beam.

Cultivator shovels or tools 8 of any approved form are secured to the lower ends of the standards 5, and the standards have slots 9 in which the fastening bolts of the shovels are adjustable vertically.

A crossbar 11 is arranged between the middle parts of the standards 5, and bears against the underside of the plow beam, so that the clamping devices are relieved of much strain which would otherwise be placed upon them. This attachment can be connected to, and disconnected from, the plow beam as often as desirable.

What I claim is:

1. The combination, with a plow beam, of two clamps which straddle the plow beam, two cultivator standards provided with cultivating tools, and pivots connecting the upper end portion of each standard with the middle portions of the said clamps upon opposite sides of the plow beam, said clamps being each movable pivotally on the standards and being adapted to be set at different angles independent of each other before being secured to the plow beam.

2. The combination, with a plow beam, of two clamps which straddle the plow beam, two cultivator standards provided with cultivating tools, a crossbar extending between the middle parts of the standards and bearing against the underside of the plow beam, and pivots connecting the upper end portion of each standard with the middle portions of the said clamps upon opposite sides of the plow beam, said clamps being each movable pivotally on the standards and being adapted to be set at different angles independent of each other before being secured to the plow beam.

In testimony whereof I have affixed my signature in the presence of two witnesses.

ROBERT V. MERRITT.

Witnesses:
N. S. HOWARD,
K. I. EDMUNDS.